United States Patent
Kaneko

[19]

[11] Patent Number: 5,933,769
[45] Date of Patent: Aug. 3, 1999

[54] PORTABLE TELEPHONE CAPABLE OF DECREASING NOISE

[75] Inventor: Yasuhiro Kaneko, Saitama, Japan

[73] Assignee: NEC Corporation, Tokyo, Japan

[21] Appl. No.: 08/893,452

[22] Filed: Jul. 11, 1997

[30]       Foreign Application Priority Data

Jul. 11, 1996   [JP]   Japan .................................. 8-182012

[51] Int. Cl.⁶ ..................................................... H04B 1/26
[52] U.S. Cl. ......................... 455/296; 455/222; 455/266; 455/220; 455/307; 455/310
[58] Field of Search ..................... 455/222, 296, 455/164.1, 220, 266, 218, 166.2, 164.2, 307, 310, 340, 350, 375

[56]                References Cited

U.S. PATENT DOCUMENTS

| | | |
|---|---|---|
| 4,527,187 | 7/1985 | Ohta . |
| 4,716,407 | 12/1987 | Borras et al. ....................... 340/825.04 |
| 5,214,790 | 5/1993 | Kozlowski et al. .................... 455/34.1 |
| 5,257,416 | 10/1993 | Cannon ................................ 455/166.2 |
| 5,498,998 | 3/1996 | Gehrke et al. ............................ 331/17 |
| 5,806,002 | 9/1998 | Wiatrowski et al. .................... 455/512 |
| 5,852,772 | 12/1998 | Lampe et al. ......................... 455/226.2 |
| 5,862,466 | 1/1999 | Erickson ................................. 455/326 |
| 5,870,513 | 2/1999 | Williams .................................. 385/24 |
| 5,884,181 | 3/1999 | Arnold et al. ........................... 455/450 |

FOREIGN PATENT DOCUMENTS

| | | |
|---|---|---|
| 0 064 819 | 11/1982 | European Pat. Off. . |
| 0 674 415 A1 | 3/1995 | European Pat. Off. ......... H04M 1/00 |
| 54-152414 | 11/1979 | Japan . |
| 60-247337 | 12/1985 | Japan . |
| 63-73720 | 4/1988 | Japan . |
| 3-171832 | 7/1991 | Japan . |
| 6-284064 | 10/1994 | Japan . |
| 8-139663 | 5/1996 | Japan . |
| 2 297 463 | 7/1996 | United Kingdom . |

Primary Examiner—David R. Hudspeth
Assistant Examiner—Vijay B. Chawan
Attorney, Agent, or Firm—Young & Thompson

[57]                 ABSTRACT

In a portable telephone, a voice filter is connected to an antenna through a receiving circuit. A filter is connected to the voice filter through a switching circuit and filters the voice signal from the voice filter to produce a filtered voice signal. The filter has a first cut-off frequency when the filter is supplied with a first clock signal. The filter has a second cut-off frequency smaller than the first cut-off frequency when the filter is supplied with a second clock signal. A telephone receiver is connected to the filter through an amplifier. A clock generating circuit is connected to the filter and generates the first clock signal when is supplied with a first frequency control signal. The clock generating circuit generates the second clock signal when is supplied with a second frequency control signal. A control circuit supplies the first frequency control signal to the clock generating circuit when a receiving field intensity from the receiving circuit is greater than a first predetermined field intensity. The control circuit supplies the second frequency control signal to the clock generating circuit when the receiving field intensity is between the first predetermined field intensity and a second predetermined field intensity smaller than the first predetermined field intensity. The control circuit supplies a switch control signal to the switching circuit when the receiving field intensity is smaller than the second predetermined field intensity. The switching circuit is off when is supplied with the switch control signal.

6 Claims, 3 Drawing Sheets

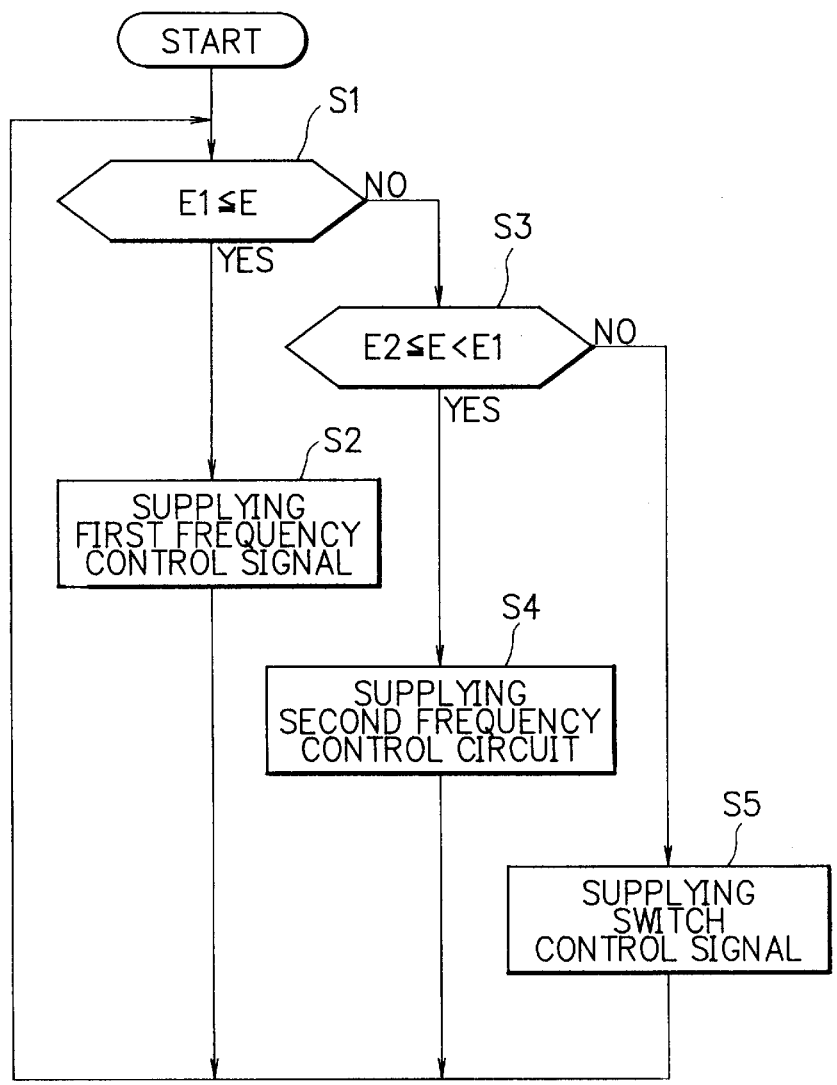

PORTABLE TELEPHONE CAPABLE OF DECREASING NOISE

BACKGROUND OF THE INVENTION

This invention relates to a portable telephone, and more particularly, to a portable telephone which is capable of decreasing a noise from an telephone receiver.

DESCRIPTION OF THE RELATED ART

In case that a person moves with such as a car while uses a portable telephone, a fading that a receiving field intensity hourly and intricately changes is caused. Conventional portable telephones have a device which decreasing an influence of a noise which is caused below of receiving field intensity. For example, a first conventional portable telephone of the type is described in Japanese Unexamined Patent Prepublication (koukai) No. 247337/1985. The first conventional portable telephone has a bandpass filter and a control circuit. The control circuit detects a receiving failure to produce and supply a filter control signal to the band pass filter. When the band pass filter is supplied with the filter control signal, a passband width of the bandpass filter is controlled.

In the manner which will later be described more in detail, a second conventional portable telephone comprises an antenna, a receiving circuit, a voice filter, a data filter, a switching circuit, an amplifier, an telephone receiver, a control circuit, and an indicating device.

The control circuit is connected to the receiving circuit, the data filter, and the switching circuit. The control circuit receives a receiving field intensity signal from the data filter and supplies the receiving field intensity signal to the indicating device. The indicating device indicates the receiving field intensity signal. The control circuit detects an error of a supervisory signal from the data filter to produce and supply the switch control signal to the switching circuit. The switching circuit connects the amplifier to the voice filter when the switching circuit is not supplied with a switch control signal from the control circuit. The switching circuit disconnects the amplifier from the voice filter when the switching circuit is supplied with the switch control signal from the control circuit.

When a receiving field intensity of a receiving field intensity signal is greater than a fist predetermined field intensity, a noise level is remarkably small. When the receiving field intensity of the receiving field intensity signal is greater than a fist predetermined field intensity, the noise level suddenly becomes greater. For example, when the receiving field intensity of the receiving field intensity signal is equal to a second predetermined field intensity which is smaller than the fist predetermined field intensity, the noise level is great. When the receiving field intensity of the receiving field intensity signal is equal to the second predetermined field intensity, the error of the supervisory signal from the data filter is easily caused. Therefore, in the conventional portable telephone, the control circuit detects the error of the supervisory signal from the data filter to disconnect the amplifier and the telephone receiver from the voice filter and the receiving circuit.

However, the conventional portable telephone has a disadvantage that a noise from the telephone receiver is caused, in a time period, until the the control circuit detects the error of the supervisory signal to disconnect the telephone receiver from the receiving circuit. Also, the conventional portable telephone has a disadvantage that it is impossible to discriminate a reason that a voice is not caused from the telephone receiver. This is because the voice is not caused from the telephone receiver when a base station does not transmit a radio signal.

SUMMARY OF THE INVENTION

It is therefore an object of this invention to provide a portable telephone which is capable of decreasing a noise level from an telephone receiver.

It is another object of this invention to provide a portable telephone which is capable of discriminating a receiving state.

Other objects of this invention will become clear as the description proceeds.

According to an aspect of this invention, there is provided a portable telephone comprising:

an antenna for receiving a radio signal to produce a receiving signal;

a receiving circuit connected to the antenna for demodulating the receiving signal to produce a receiving demodulated signal and a receiving field intensity signal;

a voice filter connected to the receiving circuit for filtering the receiving demodulated signal to produce a voice signal;

a switching circuit connected to the voice filter for outputting the voice signal from the voice filter when the switching circuit is not supplied with a switch control signal;

a filter connected to the voice filter through the switching circuit for filtering the voice signal to produce a filtered voice signal, the filter having a first cut-off frequency when the filter is supplied with a first clock signal, the filter having a second cut-off frequency smaller than the first cut-off frequency when the filter is supplied with a second clock signal;

an amplifier connected to the filter for amplifying the filtered voice signal to produce an amplified signal;

a telephone receiver connected to the amplifier for receiving the amplified signal to produce a voice;

a clock generating circuit connected to the filter for generating the first clock signal when the clock generating circuit is supplied with a first frequency control signal and for generating the second clock signal when the clockgenerating circuit is supplied with a second frequency control signal; and a control circuit connected to the receiving circuit, the switching circuit, and the clock generating circuit for supplying the first frequency control signal to the clock generating circuitwhen a receiving field intensity of the receiving field intensity signal is greater than a first predetermined field intensity, for supplying the second frequency control signal to the clock generating circuit when the receiving field intensity of the receiving field intensity signal is between the first predetermined field intensity and a second predetermined field intensity smaller than the first predetermined field intensity, and for supplying the switch control signal to the switching circuit when the receiving field intensity of the receiving fieldintensity signal is smaller than the second predetermined field intensity.

According to another aspect of this invention, there is provided a portable telephone comprising:

an antenna for receiving a radio signal to produce a receiving signal;

a receiving circuit connected to the antenna for demodulating the receiving signal to produce a receiving demodulated signal and a receiving field intensity signal;

a voice filter connected to the receiving circuit for filtering the receiving demodulated signal to produce a voice signal;

a switching circuit connected to the voice filter for outputting the voice signal from the voice filter when the switching circuit is not supplied with a switch control signal;

a filter connected to the voice filter through the switching circuit for filtering the voice signal to produce a filtered voice signal, the filter having a first cut-off frequency when the filter is supplied with a first clock signal, the filter having a second cut-off frequency smaller than the first cut-off frequency when the filter is supplied with a second clock signal;

an amplifier connected to the filter for amplifying the filtered voice signal to produce an amplified signal;

a telephone receiver connected to the amplifier for receiving the amplified signal to produce a voice;

a clock generating circuit connected to the filter for generating the first clock signal when the clock generating circuit is supplied with a first frequency control signal and for generating the second clock signal when the clock generating circuit is supplied with a second frequency control signal;

a control circuit connected to the receiving circuit, the switching circuit, and the clock generating circuit for supplying the first frequency control signal to the clock generating circuitwhen a receiving field intensity of the receiving field intensity signal is greater than a first predetermined field intensity, for supplying the second frequency control signal to the clock generating circuit when the receiving field intensity of the receiving field intensity signal is between the first predetermined field intensity and a second predetermined field intensity smaller than the first predetermined field intensity, and for supplying the switch control signal to the switching circuit when the receiving field intensity of the receiving fieldintensity signal is smaller than the second predetermined field intensity, and setting means connected to control circuit for setting the second frequency control signal in the control circuit.

BRIEF DESCRIPTION OF THE DRAWINGS

FIG. 5 is a flow chart for use in describing the operation of the portable telephone illustrated in FIG. 3; and FIG. 6 is another view for use in describing the operation of the portable telephone illustrated in FIG. 3.

DESCRIPTION OF THE PREFERRED EMBODIMENTS

Figure 1:
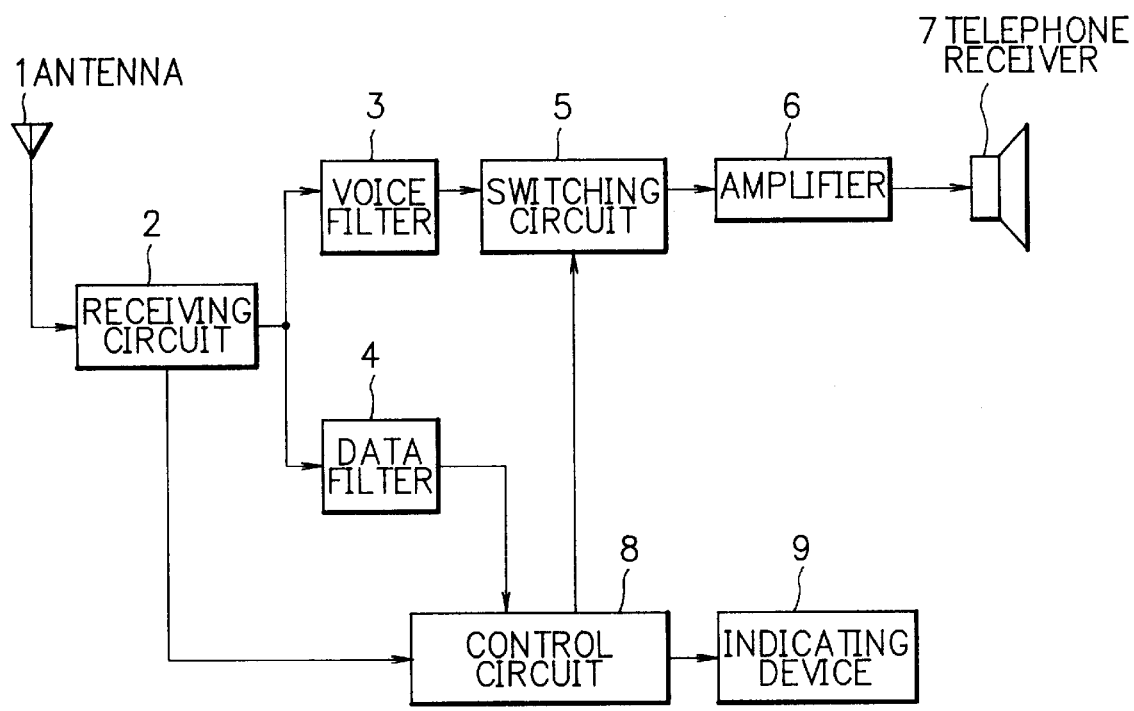
FIG. 1 is a block diagram of a conventional portable telephone.
Figure 2:
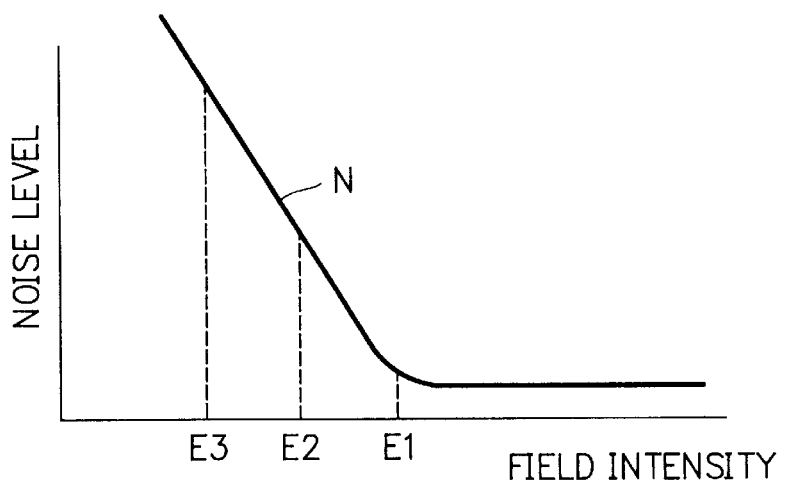
FIG. 2 is a view for use in describing an operation of the conventional portable telephone illustrated in FIG. 1.

Referring to FIGS. 1 and 2, a conventional portable telephone will be described for a better understanding of this invention.

In FIG. 1, a conventional portable telephone comprises an antenna 1, a receiving circuit 2, a voice filter 3, a data filter 4, a switching circuit 5, an amplifier 6, an telephone receiver 7, a control circuit 8, and an indicating device 9.

The antenna 1 receives a radio signal to produce a receiving signal. The receiving circuit 2 is connected to the antenna 1. The receiving circuit 2 demodulates the receiving signal to produce a receiving demodulated signal and a receiving field intensity signal. The voice filter 3 is connected to the receiving circuit 2. The voice filter 3 filters the receiving demodulated signal to produce a voice signal. The data filter 4 is connected to the receiving circuit 2 and filters the receiving demodulated signal to produce a supervisory signal.

The switching circuit 5 is connected to the voice filter 3. The switching circuit 5 outputs the voice signal from the voice filter 3 when the switching circuit 5 is not supplied with a switch control signal from the control circuit 8. The amplifier 6 is connected to the voice filter 3 through the switching circuit 5. The amplifier 6 amplifies the voice signal to produce an amplified signal. The telephone receiver 7 is connected to the amplifier 6. The telephone receiver 7 receives the amplified signal to produce a voice.

The control circuit 8 is connected to the receiving circuit 2, the data filter 4, and the switching circuit 5. The control circuit 8 receives the receiving field intensity signal and supplies the receiving field intensity signal to the indicating device 9. The indicating device 9 indicates the receiving field intensity signal. The control circuit 8 detects an error of the supervisory signal from the data filter 4 to produce and supply the switch control signal to the switching circuit 5. The switching circuit 5 connects the amplifier 6 to the voice filter 3 when the switching circuit 5 is not supplied with the switch control signal from the control circuit 8. The switching circuit 5 disconnects the amplifier 6 from the voice filter 3 when the switching circuit 5 is supplied with the switch control signal from the control circuit 8.

As shown by a curve N in FIG. 2, when a receiving field intensity of the receiving field intensity signal is greater than a fist predetermined field intensity E1, a noise level is remarkably small. When the receiving field intensity of the receiving field intensity signal is greater than a fist predetermined field intensity E1, the noise level suddenly becomes greater. For example, when the receiving field intensity of the receiving field intensity signal is equal to a third predetermined field intensity E3 which is smaller than the fist predetermined field intensity E1, the noise level is great. When the receiving field intensity of the receiving field intensity signal is equal to the third predetermined field intensity E3, the error of the supervisory signal from the data filter 4 is easily caused. Therefore, in the conventional portable telephone, the control circuit 8 detects the error of the supervisory signal from the data filter 4 to disconnect the amplifier 6 and the telephone receiver 7 from the voice filter 3 and the receiving circuit 2.

However, the conventional portable telephone has a disadvantage that a noise from the telephone receiver 7 is caused, in a time period, until the the control circuit 8 detects the error of the supervisory signal to disconnect the telephone receiver 7 from the receiving circuit 2. Also, the conventional portable telephone has a disadvantage that it is impossible to discriminate a reason that a voice is not caused from the telephone receiver 7. This is because the voice is not caused from the telephone receiver 7 when a base station does not transmit the radio signal.

Referring to FIGS. 3, 4, 5, and 6, the description will proceed to a portable telephone according to an embodiment of this invention. Similar parts are designated by like reference numerals.

Figure 3:
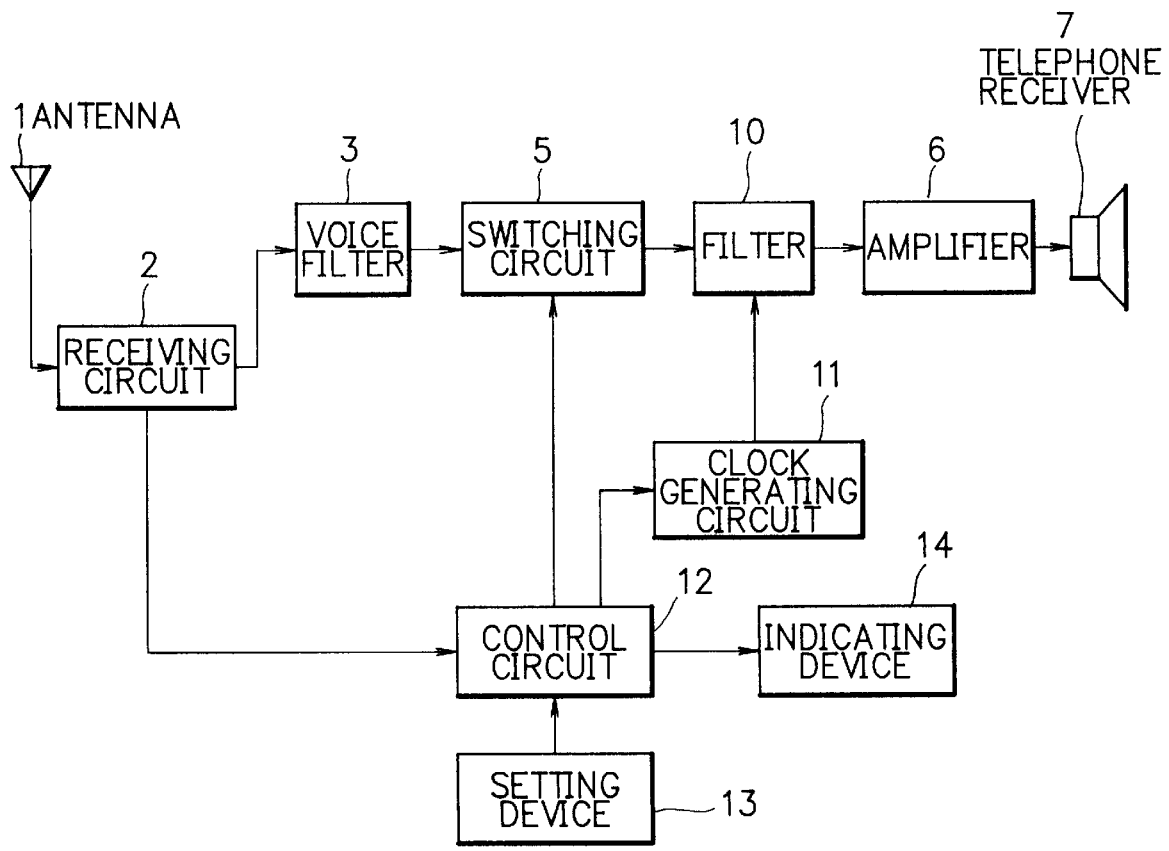
FIG. 3 is a block diagram of a portable telephone according to an embodiment of this invention.
Figure 4:
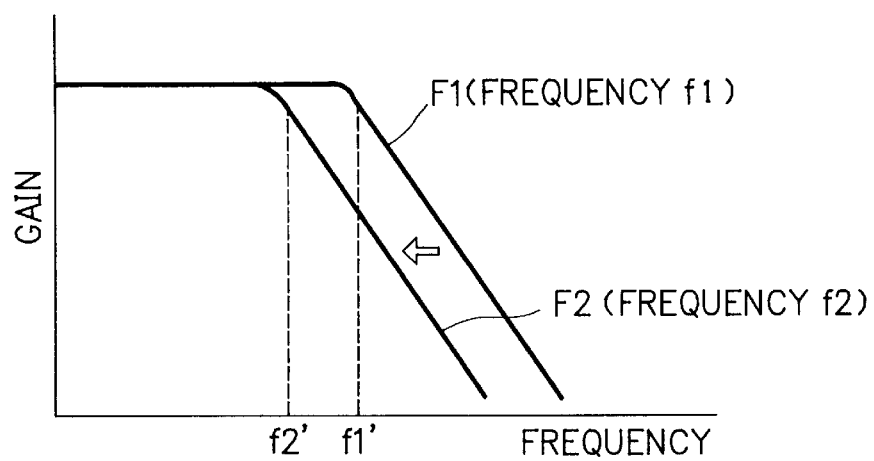
FIG. 4 is a view for use in describing an operation of the portable telephone illustrated in FIG. 3.

In FIG. 3, the portable telephone comprises the antenna 1, the receiving circuit 2, the voice filter 3, the switching circuit 5, a filter 10, the amplifier 6, the telephone receiver 7, a clock generating circuit 11, a control circuit 12, a setting device 13, and an indicating device 14.

The antenna 1 receives the radio signal to produce the receiving signal. The receiving circuit 2 is connected to the antenna 1. The receiving circuit 2 demodulates the receiving signal to produce the receiving demodulated signal and the receiving field intensity signal. The voice filter 3 is connected to the receiving circuit 2. The voice filter 3 filters the receiving demodulated signal to produce the voice signal. The switching circuit 5 is connected to the voice filter 3. The switching circuit 5 outputs the voice signal from the voice filter 3 when the switching circuit 5 is not supplied with the switch control signal form the control circuit 12.

The filter 10 is connected to the voice filter 3 through the switching circuit 5. The filter 10 comprises a switched capacitor filter which is a low pass filter. The filter 10 filters the voice signal from the switching circuit 5 to produce a filtered voice signal. As shown by a curve F1 in FIG. 4, the filter 10 has a first cut-off frequency f1' when the filter 10 is supplied with a first clock signal having a first frequency f1 form the clock generating circuit 11. Also, as shown by a curve F2 in FIG. 4, the filter 10 has a second cut-off frequency f2' smaller than the first cut-off frequency f1' when the filter 10 is supplied with a second clock signal having a second frequency f2 form the clock generating circuit 11.

When the first cut-off frequency f1' is set at a frequency of about 3 kHz and the second cut-off frequency f2' is set at a frequency of about 1 kHz, it is possible to decrease the noise, namely, a frequency of about 1 to 3 kHz. The amplifier 6 is connected to the filter 10. The amplifier 6 amplifies the filtered voice signal to produce an amplified signal. The telephone receiver 7 is connected to the amplifier 6 and receives the amplified signal to produce a voice. The clock generating circuit 11 is connected to the filter 10 and the control circuit 12. The clock generating circuit 11 generates the first clock signal when the clock generating circuit 11 is supplied with a first frequency control signal from the control circuit 12. Also, the clock generating circuit 11 generates the second clock signal when the clock generating circuit 11 is supplied with a second frequency control signal from the control circuit 12.

The control circuit 12 is connected to the receiving circuit 2, the switching circuit 5, and the clock generating circuit 11. The control circuit 12 supplies the first frequency control signal to the clock generating circuit 11 when the receiving field intensity of the receiving field intensity signal from the receiving circuit 2 is greater than the first predetermined field intensity E1 (FIG. 2). The control circuit 12 supplies the second frequency control signal to the clock generating circuit 11 when the receiving field intensity of the receiving field intensity signal from the receiving circuit 2 is between the first predetermined field intensity E1 (FIG. 2) and a second predetermined field intensity E2 (FIG. 2) smaller than the first predetermined field intensity E1 (FIG. 2). The second predetermined field intensity E2 is greater than the third predetermined field intensity E3 (FIG. 2). The control circuit 12 supplies the switch control signal to the switch circuit 5 when the receiving field intensity of the receiving field intensity signal from the receiving circuit 2 is smaller than the second predetermined field intensity E2 (FIG. 2).

The setting device 13 is connected to control circuit 12. The setting device 13 is for setting the second frequency control signal in the control circuit 12. An user operates the setting device 13 to set the second frequency control signal in the control circuit 12. For example, the setting device 13 comprises a outside switch (not shown) and a variable resistor (not shown). The indicating device 14 is connected to the control circuit 12. The control circuit 12 receives the receiving field intensity signal and compare the receiving field intensity of the receiving field intensity signal with the second predetermined field intensity E2 to produce the switch control signal when the receiving field intensity is smaller than the second predetermined field intensity E2. The control circuit 12 supplies the switch control signal to the indicating device 14. When the indicating device 14 is supplied with the switch control signal, the indicating device 14 indicates that the receiving field intensity is smaller than the second predetermined field intensity E2. In this event, for example, the indicating device 14 indicates "mute".

The switching circuit 5 outputs the voice signal from the voice filter 3 when the switching circuit 5 is not supplied with the switch control signal form the control circuit 12. Namely, the switching circuit 5 connects the filter 10 to the voice filter 3 when the switching circuit 5 is not supplied with the switch control signal form the control circuit 12. The switching circuit 5 disconnects the filter 10 from the voice filter 3 when the switching circuit 5 is supplied with the switch control signal form the control circuit 12.

Referring to FIGS. 5 and 6, the operation of the control circuit 12 will be described in detail.

In FIG. 5, at a step S1, the control circuit 12 discriminates whether or not the receiving field intensity E is greater than the first predetermined field intensity E1. When the receiving field intensity E is greater than the first predetermined field intensity E1, the step S1 proceeds to a step S2. Otherwise, the step S1 proceeds to a step S3. At the step S2. the control circuit 12 supplies the first frequency control signal to the clock generating circuit 11. In this event, the clock generating circuit 11 supplies the first clock signal having the first frequency f1 to the filter 10 (FIGS. 3 and 6).

At the step S3, the control circuit 12 discriminates whether or not the receiving field intensity E is between the first predetermined field intensity E1 and the second predetermined field intensity E2. When the receiving field intensity E is between the first predetermined field intensity E1 and the second predetermined field intensity E2, the step S3 proceeds to a step S4. Otherwise, namely, when the receiving field intensity E is smaller than the second predetermined field intensity E2. the step S3 proceeds to a step S5. At the step S4, the control circuit 12 supplies the second frequency control signal to the clock generating circuit 11. In this event, the clock generating circuit 11 supplies the second clock signal having the second frequency f2 to the filter 10 (FIGS. 3 and 6). At the step S5. the control circuit 12 supplies the switch control signal to the switching circuit 5 (FIG. 3). In this event, the switching circuit 5 becomes off (FIG. 6). The steps S2, S4, and S5 return to the step S1.

While this invention has been described in conjunction with a single preferred embodiment thereof, it will readily be possible for those skilled in the art to put this invention into practice in various other manners. For example, the filter 10 may comprise a bandpass filter instead of the low pass filter. The setting device 13 and the indicating device 14 may be omitted.

What is claimed is:

1. A portable telephone comprising:

an antenna for receiving a radio signal to produce a receiving signal;

a receiving circuit connected to said antenna for demodulating said receiving signal to produce a receiving demodulated signal and a receiving field intensity signal;

a voice filter connected to said receiving circuit for filtering said receiving demodulated signal to produce a voice signal;

a switching circuit connected to said voice filter for outputting said voice signal from said voice filter when said switching circuit is not supplied with a switch control signal;

a filter connected to said voice filter through said switching circuit for filtering said voice signal to produce a filtered voice signal, said filter having a first cut-off frequency when said filter is supplied with a first clock signal, said filter having a second cut-off frequency smaller than said first cut-off frequency when said filter is supplied with a second clock signal;

an amplifier connected to said filter for amplifying said filtered voice signal to produce an amplified signal;

a telephone receiver connected to said amplifier for receiving said amplified signal to produce a voice;

a clock generating circuit connected to said filter for generating said first clock signal when said clock generating circuit is supplied with a first frequency control signal and for generating said second clock signal when said clock generating circuit is supplied with a second frequency control signal; and a control circuit connected to said receiving circuit, said switching circuit, and said clock generating circuit for supplying said first frequency control signal to said clock generating circuit when a receiving field intensity of said receiving field intensity signal is greater than a first predetermined field intensity, for supplying said second frequency control signal to said clock generating circuit when said receiving field intensity of said receiving field intensity signal is between said first predetermined field intensity and a second predetermined field intensity smaller than said first predetermined field intensity, and for supplying said switch control signal to said switching circuit when said receiving field intensity of said receiving field intensity signal is smaller than said second predetermined field intensity.

2. A portable telephone as claimed in claim 1, wherein said portable telephone further comprises an indicating means connected to said control circuit for indicating that said receiving field intensity of said receiving field intensity signal is smaller than said second predetermined field intensity.

3. A portable telephone as claimed in claim 1, wherein said filter comprises a switched capacitor filter.

4. A portable telephone comprising:

an antenna for receiving a radio signal to produce a receiving signal;

a receiving circuit connected to said antenna for demodulating said receiving signal to produce a receiving demodulated signal and a receiving field intensity signal;

a voice filter connected to said receiving circuit for filtering said receiving demodulated signal to produce a voice signal;

a switching circuit connected to said voice filter for outputting said voice signal from said voice filter when said switching circuit is not supplied with a switch control signal;

a filter connected to said voice filter through said switching circuit for filtering said voice signal to produce a filtered voice signal, said filter having a first cut-off frequency when said filter is supplied with a first clock signal, said filter having a second cut-off frequency smaller than said first cut-off frequency when said filter is supplied with a second clock signal;

an amplifier connected to said filter for amplifying said filtered voice signal to produce an amplified signal;

a telephone receiver connected to said amplifier for receiving said amplified signal to produce a voice;

a clock generating circuit connected to said filter for generating said first clock signal when said clock generating circuit is supplied with a first frequency control signal and for generating said second clock signal when said clock generating circuit is supplied with a second frequency control signal;

a control circuit connected to said receiving circuit, said switching circuit, and said clock generating circuit for supplying said first frequency control signal to said clock generating circuit when a receiving field intensity of said receiving field intensity signal is greater than a first predetermined field intensity, for supplying said second frequency control signal to said clock generating circuit when said receiving field intensity of said receiving field intensity signal is between said first predetermined field intensity and a second predetermined field intensity smaller than said first predetermined field intensity, and for supplying said switch control signal to said switching circuit when said receiving field intensity of said receiving field intensity signal is smaller than said second predetermined field intensity, and setting means connected to control circuit for setting said second frequency control signal in said control circuit.

5. A portable telephone as claimed in claim 4, wherein said portable telephone further comprises an indicating means connected to said control circuit for indicating that said receiving field intensity of said receiving field intensity signal is smaller than said second predetermined field intensity.

6. A portable telephone as claimed in claim 4, wherein said filter comprises a switched capacitor filter.

* * * * *